Jan. 3, 1967 S. DIXON ETAL 3,296,222
PROCESS FOR CONTINUOUSLY CHLOROSULFONATING POLYETHLENE
AT HIGHER TEMPERATURES
Filed Dec. 27, 1963

INVENTORS
STANLEY DIXON
ROYCE ELTON ENNIS
JAMES KALIL
LOUIS HENRY KNABESCHUH

BY Francis A. Painter
ATTORNEY

United States Patent Office 3,296,222
Patented Jan. 3, 1967

3,296,222
PROCESS FOR CONTINUOUSLY CHLOROSULFONATING POLYETHYLENE AT HIGHER TEMPERATURES
Stanley Dixon, Hemel Hempstead, England, Royce Elton Ennis, Beaumont, Tex., James Kalil, Brandywine Hundred, Del., and Louis Henry Knabeschuh, Beaumont, Tex., assignors to E. I. du Pont de Nemours and Company, Wilmington, Del., a corporation of Delaware
Filed Dec. 27, 1963, Ser. No. 333,963
7 Claims. (Cl. 260—79.3)

This invention relates to a novel continuous process for the chlorosulfonation of polyethylene.

The continuous chlorination and chlorosulfonation of polyethylene presents many difficulties. Obvious and conventional methods applied to carrying out these reactions continuously tend to yield unsatisfactory products which, unlike those made by batch operation, are heterogeneous mixtures of products differing greatly in extent of chlorination and chlorosulfonation and have only limited utility. While it is known that the problem of heterogeneity can be solved by using the high viscosity of a solution of polyethylene to advantage and carrying out the reaction to completion in a tubular reactor under conditions of viscous laminar flow, the latter process is not uniformly suitable. For example, that process becomes less advantageous when applied to solutions of extreme viscosity such as are obtained when linear type polyethylenes are used instead of branched types of polyethylene since the former often give much more viscous solutions at the same concentration. It, therefore, may become necessary to use uneconomically dilute solutions in order to get a solution of linear polyethylene of a viscosity suitable for use in this process. Another problem is the fact that linear-type polyethylenes do not go into solution very well below 100° C. and at this temperature the chlorine reacts rapidly with the polyethylene. Further, the relative instability of the $SO_2Cl$ group at about 100°–120° C. has caused those skilled in the art to avoid chlorosulfonation at such high temperatures.

A process has unexpectedly been found which is suitable for use even with linear-type polyethylenes which enables the continuous preparation of homogeneous products at high temperatures by (1) rapidly mixing chlorine and sulfur dioxide with an inert solvent solution of polyethylene to a homogeneous mixture at a temperature of from about 85° to 105° C. and sufficient pressure to maintain all components in the liquid phase, (2) passing said mixture into a reaction vessel, before more than about ⅕ of the chlorine has reacted during mixing, said vessel being maintained at a temperature of from about 90° to 250° C. and sufficient pressure to maintain all components in the liquid phase, the temperature of said mixture being above about 140° C. prior to arresting the reaction, (3) arresting the reaction before all the chlorine has reacted, and (4) isolating the chlorosulfonated polyethylene so produced. Optionally, a small amount of an inhibitor for the reaction of chlorine with polyethylene can be added during the mixing step and a small amount of catalyst can be added after mixing but prior to entry of the mixture into the reactor. The catalyst may also be used, if desired, when no inhibitor is used.

Any polyethylene suitable for making chlorosulfonated elastomers may be used in the present invention and may be of either the branched or the linear type. The invention is particularly advantageous when applied to linear polyethylenes of low melt index (high molecular weight) and densities from about 0.93 to 0.96 which are required for making elastomers which have the best properties for most applications, since, as previously explained, other continuous processes are not easily applied to such polymers. The term "polyethylene" is meant to include homopolymers of ethylene as well as polymers of ethylene with up to 15 weight percent, preferably less than 10 percent, of another ethylenically unsaturated monomer, for example, α-olefins of up to eight carbon atoms, e.g., propylene, butene-1, octene-1, or other monomers such as vinyl acids or esters, e.g., vinyl acetate, methacrylic acid.

The essential requirements for solvents to be used in the present invention are that they be volatile, inert to chlorine and sulfur dioxide, and dissolve polyethylene at operating temperatures. In addition, they should preferably have vapor pressures so high that they completely evaporate from chlorosulfonated products when the pressure on the reaction mass is suddenly reduced in the flashing operation to atmospheric pressure or below. On the other hand, solvents (condensed gases) of very high vapor pressure at operating conditions may be objectionable because of the high strength required on the mixing and reaction vessels. Trichlorofluoromethane fulfills all the above requirements; despite the fact that the product is insoluble in this solvent under the conditions used, a homogeneous product is nevertheless obtained. Although carbon tetrachloride, the solvent commonly used for the chlorosulfonation of polyethylene, may be used to advantage in the present invention, it is difficult, when the pressure is reduced to vaporize all of the solvent. Accordingly, a second drying method, such as milling on a hot mill, drum drying, or precipitation with non-solvent, must usually be used to remove the carbon tetrachloride remaining in the product after the flashing operation.

The invention will now be described with reference to the accompanying drawing wherein.

Figure 1:
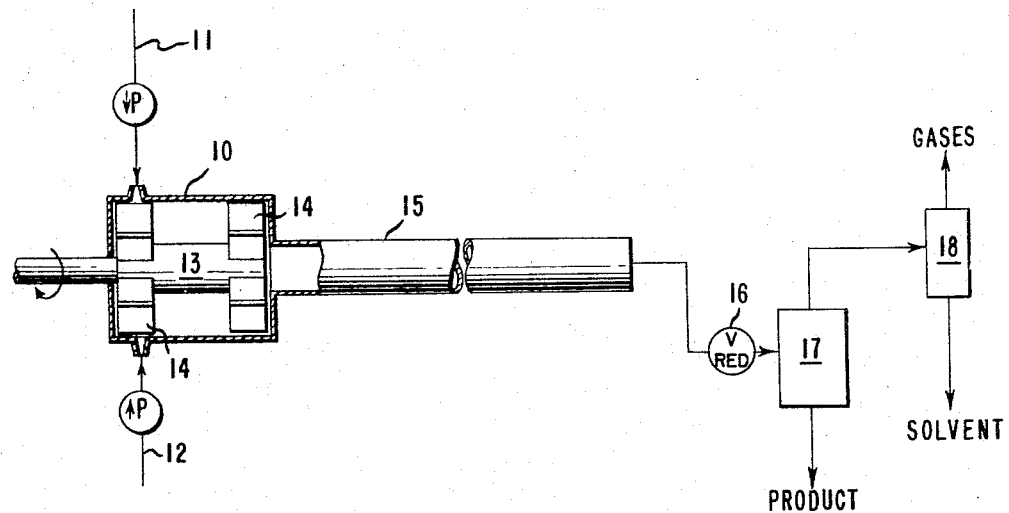
FIG. 1 is a schematic diagram of equipment suitable for carrying out the process of this invention.

Referring now to FIG. 1, the chlorine and the sulfur dioxide are first, together or separately dissolved in the inert solvent and introduced into agitated mixer 10 through inlet line 11 at the same time that a solvent solution of the polyethylene is introduced through inlet line 12. The mixer 10 is a cylindrical housing containing a rotor 13 driven at a high speed by a suitable motor (not shown). The rotor 13 has two sets of six radial blades 14 having a close clearance with the interior wall of the housing. At the opposite end of the mixer 10 from the inlet lines 11 and 12 is an outlet port leading directly into an elongated tubular reactor 15.

Both solutions introduced through inlet lines 11 and 12 are preheated to temperatures such that the temperature of the mixture is between about 85° and 105° C. The lower limit of 85° C. is generally necessary when a conventional linear polyethylene is to be used. However, a greater degree of chain branching (corresponding to densities 0.92 and below) and a lower molecular weight both tend to decrease the minimum temperature at which solvent solutions can conveniently be handled. Thus, using a more soluble type of polyethylene a lower mixing temperature can be employed. However, mixing at higher temperatures within the preferred range has the added advantage of reducing the amount of heat that must subsequently be added to the reaction. The residence time of the mixture in mixer 10 is long enough to give a homogeneous mixture but not long enough for more than about ⅕ of the chlorine to react. This time will vary for different temperatures, pressures and concentrations of materials but is readily determined by one skilled in the art.

For best operation, using trichlorofluoromethane as solvent, the mixing of the solutions of reactants should be at 90–95° C., since below this range the polyethylene is much less soluble and above, the reaction between the incompletely mixed components, may be considerable, leading to heterogeneous products.

The chlorine is preferably added in at least a 5 weight percent excess over the amount theoretically required to react with the polyethylene to yield the desired product. The continual presence of unreacted chlorine during the reaction serves to inhibit the degradation of the product after it is formed. As in the case of all chlorosulfonation processes, the sulfur dioxide is used in a large excess (e.g., tenfold) of the quantity desired in the product. The polyethylene is preferably added as a 2 to 12 weight percent solvent solution. Lower concentrations involve increased solvent removal and higher concentrations may become too viscous depending upon the polyethylene employed. The elongated reactor 15, into which the mixture is continuously passed from the mixer 10, is a heat insulated tube. For best operation, the first third of the reactor length is maintained at a temperature of from about 90° to 120° C. and the temperature of the remaining length of the reactor is from about 120° to 170° C. In any event, the reaction temperature should be above 140° C. just before flashing in order to remove substantially all the solvent. These temperatures can be maintained by the proper selection of the concentrations of solutions of reactants and by operating substantially adiabatically, with some cooling if necessary in the first part of reactor 15.

From reactor 15 the mixture passes through a reducing valve 16. A reducing valve suitable for experimental purposes has been prepared using a Grove regulator ("Mitey-Mite") modified by filling the internal V-shaped deadspaces with silver solder to prevent the hold-up of the reaction mass for long periods, with resulting decomposition. After passing through reducing valve 16 the mixture enters a flashing chamber 17 wherein the remaining gases and solvent vapor are flashed off. The product is withdrawn from the bottom of the flashing chamber 17 and the flashed gases and solvent vapor are conducted into condenser 18. In the latter the solvent is condensed and recovered and the uncondensed gases are passed out to a suitable recovery system (not shown).

When the mixture passes into the flash chamber 17 the pressure is rapidly reduced and the solvent and the unreacted chlorine and sulfur dioxide are evaporated and removed thereby arresting the reaction. When the reaction is arrested in this manner, it is preferred to have the temperature and composition of the reaction mass at the instant of reducing the pressure such that the solvent is completely evaporated. These preferable conditions are obtained by carrying out the reaction substantially adiabatically and by using a lower boiling solvent such as trichlorofluoromethane.

To achieve the desired condition that an excess of chlorine be present at all times during the reaction, it is recommended that the reaction be arrested before all the chlorine has reacted, preferably before about 95 percent of the chlorine has reacted. However, it is recommended that the reaction continue until at least about 80 percent of the chlorine has reacted. Determination of this suitable point will depend upon the specific conditions, concentrations and temperatures employed but it is, however, well within the capabilities of one skilled in the art.

Figure 2:
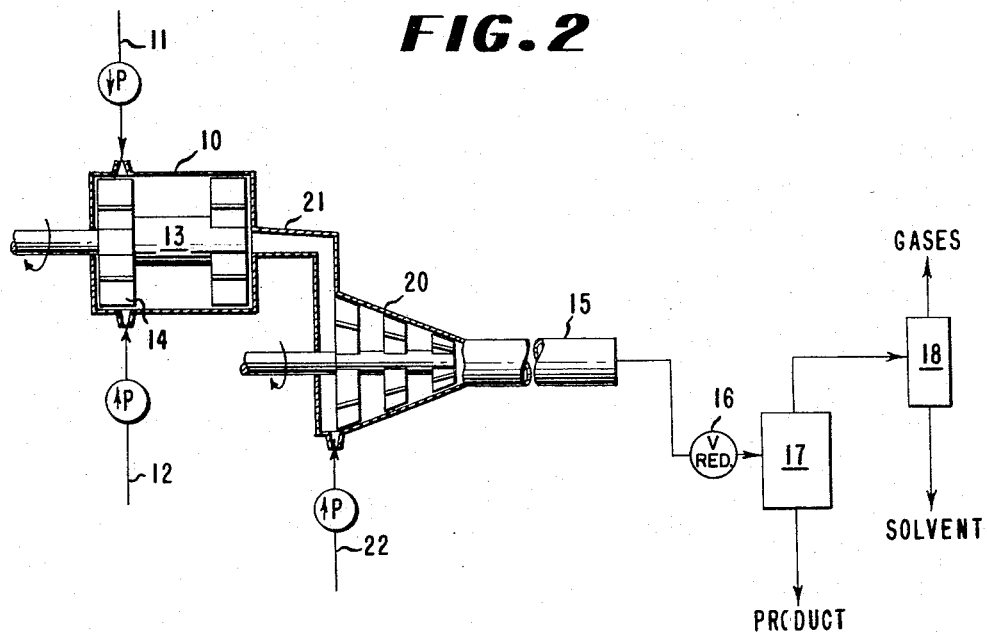
FIG. 2 is a schematic diagram of a modification of the equipment shown in FIG. 1 wherein the same reference numbers have been used to designate corresponding components.

FIG. 2 illustrates a modification of the equipment depicted in FIG. 1 which facilitates the use of an inhibitor and catalyst in the process. The inhibitor may be added concomitantly with the solutions introduced through either of inlet lines 11 and 12. In this embodiment of the process the mixture is passed from the mixer 10 to catalyst mixer 20 through conduit 21. At the same time the catalyst is introduced into the catalyst mixer 20 through inlet line 22; the mixture is then introduced immediately into the reactor 15. In all other respects the process is performed as previously described.

The inhibitor for the reaction of chlorine, with or without sulfur dioxide, with the polyethylene should be effective under the conditions which must be present in mixer 10 and also must not interfere with the subsequent reaction in the presence of added catalyst which takes place in reactor 15. In addition, it must not have any undesirable effect upon the polyethylene or its reaction products, such as discoloration or degradation. Effective inhibitors are iodine, oxygen, and 1,1-diphenyl-2-picryl hydrazine. Iodine is preferred. Oxygen, although cheap and like iodine, readily available, tends under some conditions to convert the polyethylene to lower polymers.

The catalyst is added with vigorous agitation just prior to passage of the reaction mixture through the elongated reaction vessel. The catalyst is usually of the free-radical generating type such as peroxides, persalts and azo catalysts. Examples of the peroxide catalysts are benzoyl peroxide, cumene peroxide and benzoyl hydroperoxide. Typical persalts are sodium persulfate, sodium perbenzoate and sodium percarbonate. The preferred catalysts are of the azo type such as azo bis(isobutyronitrile) and the azo catalysts described in U.S. Patents 2,503,252, 2,503,253 and 2,640,048.

The following examples will better illustrate the nature of the present invention; however, the invention is not intended to be limited to these examples. Parts are by weight unless otherwise indicated.

EXAMPLE I

The reaction is carried out in the equipment shown in FIG. 1. This is supplemented by conventional equipment for making up, heating, and filtering the solutions of the reactants and for metering them into the mixer and reactor under the pressure required to prevent the formation of a vapor phase. The mixer 10 has a volume of 19.4 cc. and the tubular reactor 15, of ⅜ inch (0.95 cm.) inside diameter, has a volume of 81 cc. The reactor is lined with a tube of polytetrafluoroethylene. Other parts in contact with solutions are of nickel. The first third of the reactor is lightly insulated and the rest heavily insulated with windings of asbestos tape. It is estimated that 35% of the heat is lost through the walls, mostly in the first section. All piping and vessels containing the polyethylene solutions are kept at 110° C. by steam jacketing to prevent separation of the solids. A gauge pressure of at least 700 lbs./sq. in. is maintained, up to the point at which the pressure is released at the end of the reactor, in order to keep all components in the liquid phase. Before operation, moisture and air are excluded by flushing with dry nitrogen.

Using trichlorofluoromethane as the solvent throughout, linear polyethylene (homopolymer) of density 0.955 and melt index 4.4 (determined by the method of ASTM D-1238-52T) is supplied as an 8% solution at 110° C. at the rate of 69 cc. per minute through line 11. Chlorine, as a 67.3% solution and sulfur dioxide as a 25.2% solution, both at 70° C. are supplied at 9.2 and 7.5 cc. per minute, respectively through line 12. The three solutions are mixed in the mixer 10, with a hold up time of 13.5 sec., giving a uniform solution containing 6.4% by weight of polyethylene, 7.4% of chlorine, and 2.2% of sulfur dioxide, at 95° C. The mixture then passes into the reactor 15, in which the average temperature at equilibrium is about 120° C. in the first, lightly insulated, third of the tube and about 165° C. in the remaining, well insulated part, in which the reaction proceeds essentially adiabatically. The hold up time is about 57 sec. About 15% of chlorine, by calculation from the feed and product compositions, remains unreacted. Immediately on leaving the reactor, the hot reaction product passes through a reducing valve 16, dropping the pressure to atmospheric. The dissolved gasses and the solvent are vaporized instantaneously, leaving the solid chlorosulfonated polyethylene as dry, porous threads and fragments in the chamber 17, from which it may be continuously removed and put into compact form for storage and shipment, by conventional sheeting or extruding equipment. Phenyl glycidyl ether, 1.5%, is incorporated as a stabilizer. The vapor phase, consisting of chlorine, sulfur dioxide, hydrogen chloride and trifluoromethane, is pumped away to condenser 18 for separation and recovery or other disposal.

The product, which contains all of the polyethylene fed, contains by analysis 32.9% chlorine and 1.1% sulfur. The inherent viscosity in chloroform is 1.01. It is light in color and is essentially identical with a product of the same composition made from the same polyethylene by the conventional batch process in carbon tetrachloride, as shown in Tables I(a) and I(b). The identity demonstrates that the products has the same advantageous homogeneity as to chlorination as is shown by the batch material. Modulus, resilience, hardness, and permanent set are particularly sensitive to lack of homogeneity. Table I(a) shows how these properties depart from normal in the case of synthetic heterogeneous blends of products of widely different chlorine content and also in the case of heterogeneous product resulting when the ingredients are not properly mixed before the continuous reaction.

*Table I(a)*

|  | Product of Example I | Product of Batch Process | Synthetic Blend [1] | Product of Continuous Process-Poor Mixing |
|---|---|---|---|---|
| Modulus (100%) in p.s.i. | 365 | 350 | 1,070 | 1,120 |
| Tensile strength in p.s.i. | 3,570 | 3,850 | 3,650 | 2,750 |
| Elongation at break, percent | 340 | 330 | 270 | 210 |
| Permanent set at break, percent | 9 | 5 | 37 | 36 |
| Hardness (Shore A) | 68 | 65 | 85 | 81 |
| Resilience [2], percent | 64 | 59 | 34 | 49 |

[1] Separately prepared chlorosulfonated polyethylene with 30 and 44% chlorine blended to give 34%.
[2] A.S.T.M. D-945-59.

All the above are made from substantially the same linear polyethylene and contain 32 to 34% chlorine and 0.9 to 1.0% sulfur.

The cured materials tested in Table I(a) above are obtained by compounding 100 parts (by weight) of elastomer, with 25 parts of litharge, 25 parts of semi-reinforcing furnace carbon black, 2 parts of dipentamethylene thiuram tetrasulfide, and 0.5 part of benzothiazyl disulfide and curing for 30 minutes at 153° F.

It is again shown in Table I(b) below, using a different compounding formula, that the product prepared by this example exhibits the same excellent properties of that prepared from a batch-process product.

*Table I(b)*

|  | Product of Example I | Product of Batch Process |
|---|---|---|
| Mooney scorch time:[1] at 250° F.: |  |  |
| 5 point rise (min.) | 9 | 10 |
| 10 point rise (min.) | 12 | 13 |
| Modulus (100%) (p.s.i.) | 1,090 | 1,330 |
| Tensile strength (p.s.i.) | 2,550 | 2,600 |
| Elongation at break (percent) | 330 | 300 |
| Hardness, Shore A | 74 | 74 |
| Permanent set (percent) | 29 | 21 |
| After aging 4 days at 300° F.: |  |  |
| Tensile strength (p.s.i.) | 2,775 | 2,700 |
| Elongation at break (percent) | 90 | 90 |
| Hardness, Shore A | 89 | 88 |
| Permanent set (percent) | 29 | 21 |
| Volume increase (percent): |  |  |
| ASTM No. 3 oil, 70 hrs./212° F | 38 | 36 |
| Olive oil—4 days/158° F | 11 | 11 |
| Water, 7 days/158° F | 0.5 | 1 |
| HNO₃ 70%, 7 days/75° F | 5 | 4 |

[1] Using the shearing disc plastometer of ASTM-D-1646-59T.

The cured materials tested in Table I(b) are obtained by compounding 1000 parts by weight of the elastomer with 40 parts of litharge, 60 parts of clay, 15 of semireinforcing carbon black, 20 parts of hydrocarbon softeners, 2 parts of microcrystalline paraffin wax, 3 parts of nickel dibutyldithiocarbamate, 2 parts of dipentamethylene thiuram tetrasulfide, and 1 part of benzothiazyl disulfide and curing for 10 minutes at 153° C.

In addition to the near-identity of above quantitatively determined properties, the milling and extrusion characteristics for both the elastomers of Table I(b) determined qualitatively, are practically identical.

EXAMPLE II

The use of a somewhat different, completely adiabatic reactor and the manufacture of a product of much lower chlorine and sulfur content is illustrated in the following. The mixer 10 is the same as in Example I but the reactor 15 has an inside diameter of ⅞ inch (2.22 cm.) and volume of 177 cc. and is well insulated throughout. Except as mentioned below, all the operations are as in Example I. The same linear polyethylene is introduced into the mixer as an 8% solution in trichlorofluoromethane at 90° C. at a rate of 186 cc. per minute, along with a 66.5% solution of chlorine at 70° C. at 16 cc. per minute, and a 25.0% solution of sulfur dioxide at 70° C. at 18.9 cc. per minute. The hold-up in the mixer 10 is therefore 5.1 sec. The resulting homogeneous solution at 97° C. is sent through the reactor in which the hold-up is 47 sec. and thence through reducing valve 16 to the flashing chamer 17. The product contains 25.0% chlorine and 0.8% sulfur and has an inherent viscosity in chloroform of 1.11. The chlorine utilization is 93%. It is light in color and except for tensile strength, is essentially identical with the batch material made from the same polyethylene and containing the same amounts of chlorine and sulfur as shown in Table II.

*Table II*

|  | Product of Example II | Product of Batch Process |
|---|---|---|
| Modulus (100%), p.s.i. | 313 | 290 |
| Tensile strength, p.s.i. | 1,820 | 2,260 |
| Elongation at break, percent | 880 | 740 |
| Hardness, Shore A | 75 | 73 |
| Resilience, percent | 57 | 59 |

The compounding and curing is the same as given in Example I(a). Phenyl glycidyl ether (1.5%) is added as stabilizer.

EXAMPLE III

The equipment used is like that of Example I except that the reactor 15 has a volume of 181 cc. An 8% solution of the same linear polyethylene in trichlorofluoromethane at the rate of 182 cc. per minute, a 66.2% solution of chlorine in the same solvent at the rate of 182 cc. per minute, a 66.2% solution of chlorine in the same solvent at the rate of 15.1 cc. per minute, and additional trichlorofluoromethane at the rate of 16.3 cc. per minute are mixed at 700 lbs./sq. in. pressure and about 100° C., with a hold-up time of 5.4 sec. The temperature at the beginning of the reactor 15 is 128° C. and 159° C. at the middle and end, and the reaction time is 51 sec., 95% of the chlorine reacting. The product is substantially free of solvent, is light in color, and contains 25% chlorine. In physical properties it resembles closely the product of the same chlorine content made from the same polyethylene by the usual batch process, using carbon tetrachloride as the solvent.

EXAMPLE IV

The reaction is carried out in the equipment shown in FIG. 2. This is supplemented by conventional equipment for making up, heating, and filtering the solutions of the reactants and for metering them into the two mixers 10 and 20 and the reactor 15 under the pressure required to prevent the formation of a vapor phase. The mixer 10 has a volume of 108 cc. and the tubular reactor 15, of 3/8 inch (0.95 cm.) inside diameter, has a volume of 51 cc. The second mixed 20 has a volume of 23.1 cc. The reactor is lined with a tube of polytetrafluoroethylene. Other parts in contact with solutions are of nickel. The first third of the reactor is lightly insulated and the rest heavily insulated with windings of asbestos tape. It is estimated that 35% of the heat is lost through the walls, mostly in the first section. All piping and vessels containing the polyethylene solutions are kept at 110° C. by steam jacketing to prevent separation of the solid. A gauge pressure of 780 lbs./sq. in. is maintained, up to the point at which the pressure is released at the end of the reactor, in order to keep all components in the liquid phase. Before operation, moisture and air are excluded by flushing with dry nitrogen.

Using trichlorofluoromethane as the solvent throughout, linear polyethylene of density 0.955 and melt index 4.4, is supplied as an 8% solution at 100° C. at the rate of 70.5 cc./min. to the first mixer 10 through line 11. Chlorine as a 68.0% solution, sulfur dioxide as a 25.0% solution, and iodine (inhibitor) as a 0.25% solution are supplied at 6.2, 4.6, and 8.66 cc./min., respectively; these three solutions are introduced through line 12. The resulting uniform mixture of polyethylene, sulfur dioxide, chlorine and iodine is mixed in catalyst mixer 20 with a 0.13% solution of azo bis(isobutyronitrile) catalyst in trichlorofluoromethane, introduced at a rate of 37 cc./min. The mixture then passes into the reactor 15, in which the average overall temperature at equilibrium is about 150° C. The hold-up time is about 25 seconds. About 15% of the chlorine, by calculation from the feed and product compositions, remains unreacted. Immediately on leaving the reactor, the hot reaction product passes through a reducing valve 16, dropping the pressure to atmospheric. The dissolved gases and the solvent are vaporized instantaneously, leaving the solid chlorosulfonated polyethylene as dry, porous threads and fragments in the chamber 17, from which it may be continuously removed and put into compact form for storage and shipment, by conventional sheeting or extruding equipment. The vapor phase, consisting of chlorine, sulfur dioxide, hydrogen chloride and trichlorofluoromethane, is pumped away into condenser 18 for separation and recovery or other disposal.

The product contains by analysis 31.5% chlorine and 1.03 sulfur. The inherent viscosity on chloroform is 1.1. It is light in color and closely approaches a product of the same composition made from the same polyethylene by the conventional batch process in carbon tetrachloride. These properties, shown in Table IV, include modulus, permanent set, hardness, and tensile of the cured material, which are particularly sensitive to lack of homogeneity.

The product of Example IV is tested by compounding 100 parts by weight with 25 parts of litharge, 10 parts of semi-reinforcing black, 3 parts of nickel dibutyl dithiocarbamate, 2 parts of 2,6 - ditertiary butyl - 4-methyl phenol, 0.5 part of benzothiazyl disulfide, and 0.8 part of dipentamethylene thiuram tetrasulfide and cured for 30 minutes at 153° C. The results are as follows in comparison with the batch process material in the same formulation:

Table IV

|  | Product of Example IV | Product of Batch process |
| --- | --- | --- |
| Modulus (100%), p.s.i. | 200 | 175 |
| Tensile strength, p.s.i. | 2,950 | 3,225 |
| Permanent set, percent | 31 | 7 |
| Hardness (Shore A) | 73 | 65 |
| Volume increase (percent) in ASTM No. 3: |  |  |
| Oil, 70 hours at 212° F | 106 | 99 |
| Olive oil, 7 days at 158° F | 102 | 88 |
| Water, 7 days at 158° F | 4 | 4 |
| HNO₃ 70%, 7 days at 75° F | 21 | 27 |

EXAMPLE V

The equipment is as shown in FIG. 2 except that the rotor 13 in mixer 10 has a single set of blades. The mixer 20 is in the form of a hollow cone containing a conical rotor with close clearance. Two ports 21 and 22 at opposite sides and near the base of the cone admit the mixed but inhibited reactants and the catalyst solution, respectively. These are rapidly mixed by passage between the rotating rotor and shell and leave through a port at the apex of the cone and enter the reactor 15.

An 8% (by weight) solution of the linear polyethylene used in Example IV, in carbon tetrachloride, is mixed in the first mixer 10 with a solution of 56.5 parts by weight of chlorine and 19.0 parts of sulfur-dioxide in 24.5 parts of carbon tetrachloride to which 1.7 parts of O₂ has been added. The polyethylene solution is fed at a rate to give 7.75 grams of polyethylene per minute along with 15.6 grams of second solution per minute. The temperature in the mixer 10 is about 100° C. and the hold-up time 4.2 minutes. In the catalyst mixer 20, the thoroughly mixed material from mixer 10 is mixed with a hold-up of 0.16 second with a 0.1% solution of catalyst azobisbutyronitrile in carbon tetrachloride, fed at such a rate as to give 0.9 part of catalyst per 100 parts of polyethylene in the other solution. This final mixture then passes to the reactor 15, a nickel tube of 0.25 inch (0.62 cm.) internal diameter which is insulated with asbestos tape and provided with electrical heating. The residence time in reactor 15 is 70 seconds and the temperature about 120° C. at the start and about 140 to 150° C. at the middle and end. The pressure is between 450 and 490 lbs./sq. in. throughout.

The reaction mass passes through the reducing valve 16 into the chamber 17 at atmospheric pressure where unreacted sulfur dioxide and chlorine, by-product hydrogen chloride, and most of the carbon tetrachloride solvent are vaporized and leave through the top. The concentrated solution of the product in carbon tetrachloride is collected under methanol, which precipitates the solid product from which the residual solvent is removed by rinsing with acetone and drying in a vacuo at 60° C. The dry product contains 33.8% chlorine and 1.2% sulfur. About 92% of the chlorine fed reacts during the process. Properties of this product after compounding and curing are given in Table VII infra. As in the case of Example IV, the product approaches closely to the batch-produced material used as standard in the properties which are sensitive to heterogeneity.

EXAMPLE VI

Example V is repeated, using a more viscous linear polyethylene of melt index 0.7 and density 0.959, as a 4% solution in carbon tetrachloride, to compensate for the greater viscosity. The reaction is very similar to that of the previous examples and less than 6% of the chlorine reacts during mixing. The properties of the product containing 36.5% chlorine and 1.02% sulfur are given in Table VII infra.

The values of the critical properties shown for the products of Examples V and VI may be somewhat better than would be obtained if the extraction with acetone had not been used to remove part of the carbon tetrachloride solvent. This method tends to remove some of the highly chlorinated polyethylene of low molecular weight which is present in the heterogeneous products. The process of removing carbon tetrachloride with acetone, however, has no important effect in improving heterogeneous products. Thus a very heterogeneous product made as in Example VI but with the important differences that about 20% of the chlorination takes place under poor conditions of agitation in the first mixer and that the catalyst is then added without any mechanical agitation, is still very heterogeneous, even when isolated by the use of methanol, as shown by the figures in Table VII infra.

EXAMPLE VII

An 8% solution in carbon tetrachloride of the polyethylene used in Example VI is chlorosulfonated as in that example with the chief difference that a 0.01% solution of 1,1-diphenyl-2-picryl hydrazine in carbon tetrachloride is used instead of oxygen as the inhibitor and is fed at a rate to give 0.048% of the hydrazine based on the chlorine. The polyethylene solution is fed at 15.5 grams per minute and the $Cl_2/SO_2/CCl_4$ mixture at 29.9 grams per minute along with the inhibitor solution. The hold-up in the first mixer 10 is 5.1 minutes and 12% of the chlorine reacts. The catalyst amounts to 0.8% by weight based on the polyethylene, the hold-up in the reactor 15 is 33 seconds, 95% of the chlorine reacts, and the isolated product contains 33.6% chlorine and 0.75% sulfur. Its properties after compounding and curing are given in Table VII below.

The present invention gives a practical and convenient continuous process particularly applicable to high-molecular linear polyethylene. The process is very rapid, using high temperatures without bad effect on the product, producing chlorosulfonated polyethylenes which is as homogeneous as the best batch-produced material. The chloro-sulfonated polyethylene prepared by the process of this invention is fully equivalent to the batch-produced material in working properties, vulcanization properties and in the mechanical, chemical, and aging properties of the vulcanizate. The process has the added advantage that in operating at comparatively high temperatures the solvent and gases are conveniently flashed off, especially when trichlorofluoromethane is used as the solvent. From the standpoint of thermal efficiency this process is extraordinarily advantageous since it permits the use of preheated reactants during the mixing step thereby enabling a rapid and efficient development of the reaction temperature.

The products produced are readily compounded and cured to elastic articles possessing exceptional resistance to solvents, weathering and chemical attack as well as good physical properties.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. A process for continuously chlorosulfonating polyethylene which comprises (1) rapidly mixing chlorine and sulfur dioxide in a mixer with an inert volatile solvent solution of polyethylene to a homogeneous mixture at a temperature of from about 85° to 105° C. and sufficient pressure to maintain all components in the liquid phase, (2) passing said mixture from said mixer into a reaction

*Table VII*

|  | Modulus 100%, p.s.i. | Tensile Strength, p.s.i. | Permanent set, percent | Hardness (Shore A) | Resilience,[1] percent |
| --- | --- | --- | --- | --- | --- |
| Example IV | 692 | 3,120 | 27 | 73 | 56 |
| Example V | 525 | 2,850 | 5 | 72 | 58 |
| Example VI | 570 | 3,500 | 10 | 72 | 50 |
| Example VII | 615 | 3,400 | 10 | 74 | 63 |
| Batch Product | 350 | 3,850 | 5 | 65 | 59 |
| Synthetic Blend [2] | 1,070 | 3,650 | 36 | 85 | 34 |
| Continuous Process with poor mixing [3] | 1,120 | 2,750 | 37 | 81 | 49 |

[1] A.S.T.M. D-945-59.
[2] Separately prepared products with 30 and 44% chlorine blended to give 34%.
[3] See paragraph following Example VI.
All products tested above contain about 33% chlorine and 0.9% sulfur and are first stabilized with 1.5% phenyl glycidyl ether or equivalent amount of the diglycidyl ether of 4,4'-isopropylide bisphenol. One hundred parts by weight of this is compounded in each case with 25 parts of litharge, 25 parts of semi-reinforcing carbon black, 2 parts of dipentamethylene thiuram tetrasulfide and 0.5 part of benzothiazyl disulfide and cured for 30 minutes at 153° C.

Examples V through VII illustrate that $CCl_4$ may be used as the solvent instead of the more volatile trichlorofluoromethane with the result that quite satisfactory products are obtained. It is clear, however, that the use of trichlorofluoromethane solvent eliminates the additional step of solvent removal with methanol and acetone.

The process of this invention can be used to advantage for mere chlorination, i.e., reaction with chlorine without any sulfur dioxide present. This reaction is conducted in the manner described herein except that no sulfur dioxide is employed and consequently, no sulfur is present in the product.

The process of this invention may be employed to prepare polyethylenes containing from 20 to 50 percent chlorine and from 0 to 4 percent sulfur; preferably, chlorosulfonated polyethylenes as prepared containing from about 25 to 40 percent chlorine and from about 0.1 to 2 percent sulfur.

vessel, before more than about ⅕ of the chlorine has reacted during mixing, said vessel being maintained at a temperature of from about 90° to 250° C. and sufficient pressure to maintain all components in the liquid phase, the temperature of said mixture being above about 140° C. prior to arresting the reaction, and (3) arresting the reaction before all the chlorine has reacted by passing said mixture to a chamber of lower pressure wherein the unreacted chlorine and sulfur dioxide are evaporated.

2. A process as defined in claim 1 wherein said reaction vessel is tubular with the first one-third of its length maintained at a temperature of from about 90° to 120° C. and the remainder at a temperature of from about 120° to 170° C.

3. A process as defined in claim 1 wherein said polyethylene has a density of from about 0.93 to 0.96, said solvent is trichlorofluoromethane and the temperature of the mixing step (1) is from about 90° to 95° C.

4. A process as defined in claim 1 wherein said reaction is arrested when from about 80 to 95 weight percent of the chlorine has reacted.

5. A process as defined in claim 1 wherein a small amount of an inhibitor for the reaction of chlorine with polyethylene is added to said mixture of step (1).

6. A process as defined in claim 1 wherein a small amount of a free-radical generating type catalyst for said reaction is added to said mixture after mixing step (1).

7. A process for continuously chlorosulfonating polyethylene having a density from about 0.93 to 0.96 which comprises (1) rapidly mixing chlorine and sulfur dioxide with about a 2 to 12 weight percent solution of said polyethylene in trichlorofluoromethane at a temperature of from about 90° to 95° C. and sufficient pressure to maintain all components in the liquid phase, (2) passing said mixture from said mixer, before more than about 1/5 of the chlorine has reacted during mixing, into a tubular reactor with the first one-third of its length maintained at a temperature of from about 90° to 120° C. and the remainder at a temperature of from about 120° to 170° C. and sufficient pressure to maintain all components in the liquid phase, the temperature of said mixture being above about 140° C. prior to arresting the reaction, and (3) arresting the reaction, when from about 80 to 95 weight percent of the chlorine has reacted, by passing said mixture into a chamber of lower pressure wherein the unreacted chlorine and sulfur dioxide are evaporated.

References Cited by the Examiner

UNITED STATES PATENTS

| | | | |
|---|---|---|---|
| 2,586,363 | 2/1952 | McAlevy | 260—79.3 |
| 2,920,062 | 1/1960 | McFarland | 260—88.2 |
| 2,964,509 | 12/1960 | Hunt | 260—94.9 |
| 3,180,856 | 4/1965 | Szalla et al. | 260—79.3 |

FOREIGN PATENTS 897,081　5/1962　Great Britain.

JOSEPH L. SCHOFER, *Primary Examiner.*

J. F. McNALLY, D. K. DENENBERG,
*Assistant Examiners.*